(12) United States Patent
Garrett, Jr. et al.

(10) Patent No.: US 10,496,277 B1
(45) Date of Patent: Dec. 3, 2019

(54) METHOD, APPARATUS AND COMPUTER PROGRAM PRODUCT FOR STORING DATA STORAGE METRICS

(71) Applicant: EMC Corporation, Hopkinton, MA (US)

(72) Inventors: Wayne E. Garrett, Jr., Bellingham, MA (US); Joseph J. Burbage, Jr., Townsend, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/984,824

(22) Filed: Dec. 30, 2015

(51) Int. Cl.
*G06F 3/06* (2006.01)

(52) U.S. Cl.
CPC .......... *G06F 3/0604* (2013.01); *G06F 3/0638* (2013.01); *G06F 3/0653* (2013.01); *G06F 3/0673* (2013.01)

(58) Field of Classification Search
USPC ....................................................... 711/156
See application file for complete search history.

(56) References Cited

U.S. PATENT DOCUMENTS

| | | | | |
|---|---|---|---|---|
| 5,649,153 A * | 7/1997 | McNutt | ............... | G06F 12/0866 711/112 |
| 6,993,454 B1 * | 1/2006 | Murstein | ............. | G06F 11/3476 702/182 |
| 7,277,821 B2 * | 10/2007 | Ochi | ................... | G06F 11/3409 702/182 |
| 8,732,118 B1 * | 5/2014 | Cole | ................. | G06F 17/30563 707/600 |
| 8,751,757 B1 * | 6/2014 | Gaikwad | ............. | G06F 11/3485 711/154 |
| 8,838,931 B1 * | 9/2014 | Marshak | ............... | G06F 3/0605 710/74 |
| 8,868,797 B1 * | 10/2014 | Kirac | ...................... | G06F 3/061 710/15 |
| 9,280,470 B2 * | 3/2016 | Iyengar | ................. | G06F 12/084 |
| 9,311,228 B2 * | 4/2016 | Daly | ..................... | G06F 12/023 |
| 2001/0049773 A1 * | 12/2001 | Bhaysar | ............. | G06F 12/0813 711/147 |
| 2005/0108478 A1 * | 5/2005 | Holloway | ........... | G06F 12/0848 711/119 |
| 2006/0026229 A1 * | 2/2006 | Ari | ...................... | G06F 12/0888 709/203 |
| 2006/0085166 A1 * | 4/2006 | Ochi | ................... | G06F 11/3409 702/186 |
| 2007/0005296 A1 * | 1/2007 | Beresniewicz | ....... | G06F 11/328 702/181 |

(Continued)

Primary Examiner — Mano Padmanabhan
Assistant Examiner — Jean C Edouard
(74) Attorney, Agent, or Firm — Krishnendu Gupta

(57) ABSTRACT

There are disclosed herein techniques for use in acquiring data storage metrics. The techniques comprise monitoring an I/O operation relating to data storage. The techniques also comprise producing a metric value in connection with the I/O operation. The techniques also comprise determining a current metric value associated with a memory location in an operating system kernel. The techniques also comprise performing a computation to generate a new metric value. The computation is based on the metric value and the current metric value. The techniques further comprise storing the new metric value in the memory location in the operating system kernel.

17 Claims, 4 Drawing Sheets

(56) References Cited

U.S. PATENT DOCUMENTS

| | | | |
|---|---|---|---|
| 2007/0043537 A1* | 2/2007 | Ochi | G06F 11/3409 702/186 |
| 2008/0127149 A1* | 5/2008 | Kosche | G06F 8/443 717/158 |
| 2010/0311023 A1* | 12/2010 | Kan | G09B 19/0038 434/258 |
| 2011/0099627 A1* | 4/2011 | Proudler | G06F 21/57 726/21 |
| 2011/0208919 A1* | 8/2011 | Pruthi | G06F 12/0862 711/137 |
| 2011/0225288 A1* | 9/2011 | Easterday | G06F 17/30306 709/224 |
| 2012/0072639 A1* | 3/2012 | Goss | G06F 12/0246 711/103 |
| 2012/0079353 A1* | 3/2012 | Liikanen | G06F 11/1048 714/773 |
| 2012/0226858 A1* | 9/2012 | Steitz | G06F 17/30221 711/117 |
| 2012/0290779 A1* | 11/2012 | Eleftheriou | G06F 3/0616 711/103 |
| 2013/0318236 A1* | 11/2013 | Coates | H04L 41/22 709/224 |
| 2013/0318600 A1* | 11/2013 | Serrano | G06F 21/6245 726/22 |
| 2014/0005979 A1* | 1/2014 | Rao | G06F 11/3409 702/179 |
| 2014/0095422 A1* | 4/2014 | Solomon | G06Q 10/06312 706/46 |
| 2014/0281121 A1* | 9/2014 | Karamcheti | G06F 3/061 711/102 |
| 2014/0344287 A1* | 11/2014 | Carvalho | G06F 17/30433 707/748 |
| 2015/0208367 A1* | 7/2015 | Khude | H04W 4/023 370/312 |
| 2015/0310371 A1* | 10/2015 | Byrne | G06Q 10/06375 705/7.39 |

\* cited by examiner

METHOD, APPARATUS AND COMPUTER PROGRAM PRODUCT FOR STORING DATA STORAGE METRICS

TECHNICAL FIELD

The present invention relates generally to data storage. More specifically, the present invention relates to a method, apparatus and computer program product for storing data storage metrics.

BACKGROUND OF THE INVENTION

Data storage systems conventionally include one or more storage processors connected to a disk array via a high-speed transmission medium, such as optical fiber. An example of a data storage system is the VNX® platform from EMC Corporation of Hopkinton, Mass.

Many data storage systems produce metrics that reflect their performance and workload. One such type of metric is a short term average service time that is determined by calculating a moving average of the last n values of interest. However, the calculating of the moving average is a very resource intensive computation. Such a calculation typically requires storing the last n values so that the moving average may be taken over those values. This requires at least n memory locations (e.g., n may typically be several thousand storage locations) plus a few extra memory locations for computations. This large size prevents the code from being run in the kernel.

Furthermore, it is desirable to calculate the short term moving average service time for each component. If there are m components then at least n×m memory storage locations are required for the calculation (e.g., m may typically be several hundred so n×m may be several hundred thousand memory locations). This puts further resource demands on the system that again cannot be practically realized by code running in the kernel.

The determination of trends in the short term moving average service times further increases the number of resources required. If the trend over the last p moving averages is needed then it is necessary to calculate p moving averages. The determination of the trends in the service time short term moving averages for each component requires at least n×m×p memory storage locations (e.g., p may typically be 4 or 5 so n×m×p is on the order of a million storage locations). The puts even further resource demands on the system with code that cannot be run in the kernel.

There is, therefore, a need for a new improved approach for dealing with the storing of data storage metrics.

SUMMARY OF THE INVENTION

There is disclosed a computer-implemented method, comprising executing, on at least one processor, the steps of: monitoring an I/O operation relating to data storage; producing a metric value in connection with the I/O operation; determining a current metric value associated with a memory location in an operating system kernel; performing a computation to generate a new metric value, wherein the computation is based on the metric value and the current metric value; and storing the new metric value in the memory location in the operating system kernel.

There is also disclosed an apparatus, comprising: memory; and processing circuitry coupled to the memory, the memory storing program code which, when executed by the processing circuitry, cause the processing circuitry to: monitor an I/O operation relating to data storage; produce a metric value in connection with the I/O operation; determine a current metric value associated with a memory location in an operating system kernel; perform a computation to generate a new metric value, wherein the computation is based on the metric value and the current metric value; and store the new metric value in the memory location in the operating system kernel.

There is further disclosed a computer program product having a non-transitory computer readable medium which stores a set of instructions, the set of instructions, when carried out by processing circuitry, causing the processing circuitry to: monitor an I/O operation relating to data storage; produce a metric value in connection with the I/O operation; determine a current metric value associated with a memory location in an operating system kernel; perform a computation to generate a new metric value, wherein the computation is based on the metric value and the current metric value; and store the new metric value in the memory location in the operating system kernel.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Embodiments of the invention will now be described. It is understood that such embodiments are provided by way of example to illustrate various features and principles of the invention, and that the invention hereof is broader than the specific examples of embodiments disclosed herein.

Figure 1:
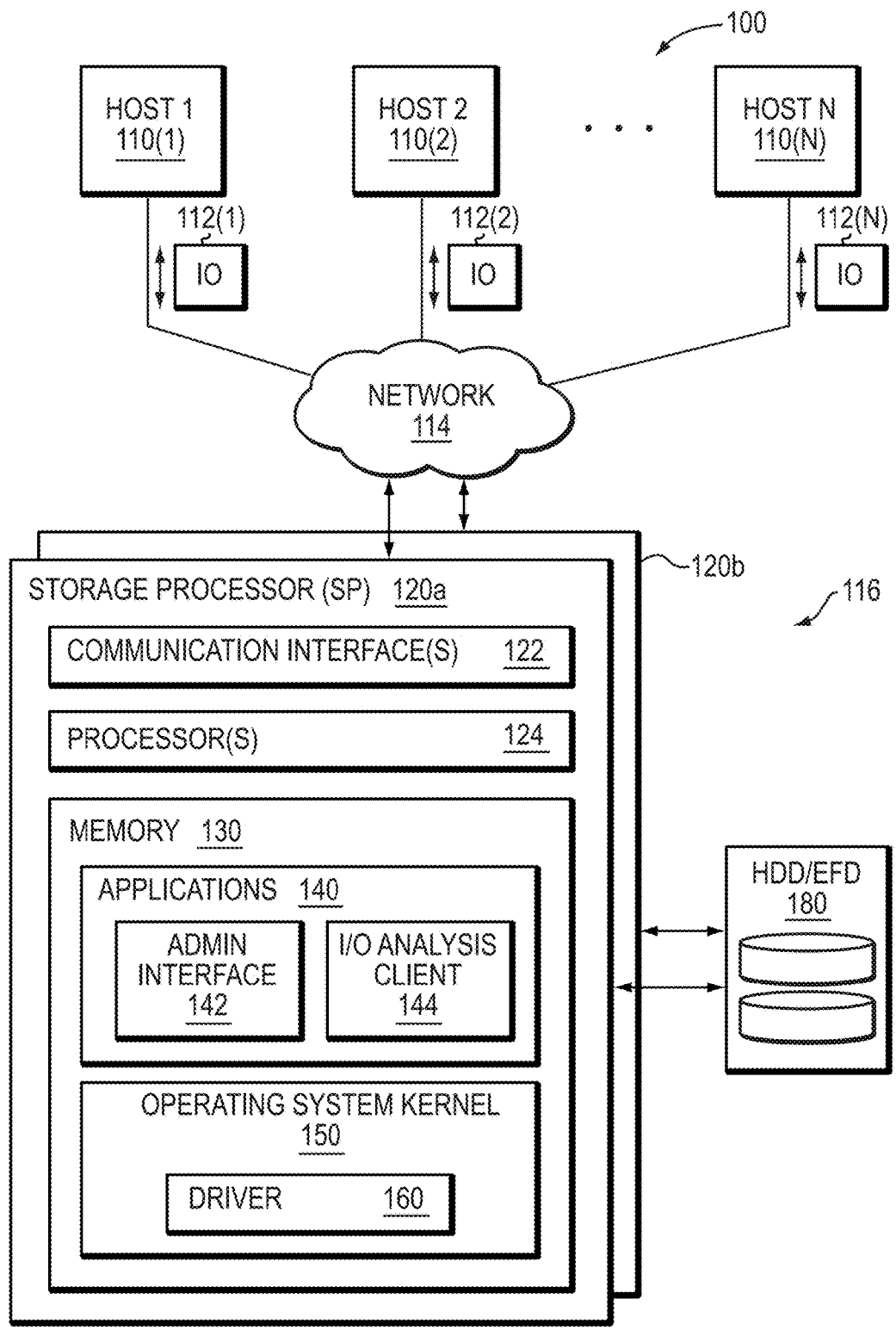
FIG. 1 is a block diagram of an example environment in which embodiments of the invention hereof can be practiced.

FIG. 1 illustrates an example environment 100 in which embodiments of the improved technique hereof can be practiced. Here, multiple host computing devices ("hosts") 110(1) through 110(N) access a data storage apparatus 116 over a network 114. The data storage apparatus 116 includes first and second storage processors, or "SPs," 120a and 120b and a set of storage devices 180. The set of storage devices 180 include, for example, hard disk drives, electronic flash drives, solid state drives, and/or other types of storage devices. The SPs 120a and 120b may be provided as circuit board assemblies, or "blades," which plug into a chassis that encloses and cools the SPs. The chassis has a backplane or midplane for interconnecting the SPs, and additional connections may be made among SPs using cables. It is understood, however, that no particular hardware configuration is required, as any number of SPs (including a single one) can be provided and the SPs 120a and 120b can each be any type of computing device capable of communicating with hosts 110(1-N). In an example, the SPs 120a and 120b are configured in a similar manner; however, this is not required.

The network 114 can be any type of network or combination of networks, such as a storage area network (SAN), local area network (LAN), wide area network (WAN), the Internet, and/or some other type of network or combination of networks. The hosts 110(1-N) connect to the SP 120 using various technologies, such as Fibre Channel, iSCSI, NFS (Network File System), SMB 3.0 (Server Message Block), and/or CIFS (Common Internet File System), for example. Any number of hosts may be provided, using any of the above protocols, some subset thereof, or other protocols besides those shown. As is known, Fibre Channel and iSCSI are block-based protocols, whereas NFS, SMB 3.0, and CIFS are file-based protocols. The SPs 120a and 120b are configured to receive requests 112(1-N) according to the respective protocols and to respond to such requests 112(1-N). For example, the SPs 120a and 120b may respond to file-based requests by performing file-based operations on user file systems, file-based vVOLs (virtual volumes), and/or other file-based objects. Also, the SPs 120a and 120b may respond to block-based requests by performing block-based operations on user LUNs, block-based vVOLs, and/or other block-based data objects.

The SP 120a is seen to include one or more communication interfaces 122, a set of processing units 124, and memory 130. The communication interfaces 122 include, for example, network interface adapters and SCSI adapters, for converting electronic and/or optical signals received from the network 114 to electronic form for use by the SP 120a. The set of processing units 124 includes one or more processing chips and/or assemblies. In a particular example, the set of processing units 124 includes multiple CPU cores. The memory 130 includes both volatile memory (e.g., RAM), and non-volatile memory, such as one or more ROMs, disk drives, solid state drives (SSDs), and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are made to carry out the operations of the software constructs. Although certain software constructs are specifically shown and described, it is understood that the memory 130 typically includes many other software constructs, which are not shown, such as various applications, processes, and daemons.

As further shown in FIG. 1, the memory 130 includes application programs 140. The application programs 140 include an administrative interface 142 that permits an administrator to manage and configure driver 160. The application programs 140 also include an I/O analysis client 144 that enables data analysis. The memory 126 also includes an operating system kernel 150. The driver 160 is installed within the kernel 150 as a kernel extension, e.g., a portion of executable code that runs in kernel space. The operating system 150 can be any type of operating system that supports the installation of the driver 160 as a kernel extension. These may include conventional, GUI-based operating systems, embedded operating systems, real-time operating systems, and so on. Non-limiting examples include the Windows™ operating system, Unix, Red Hat Linux, for instance.

Figure 2:
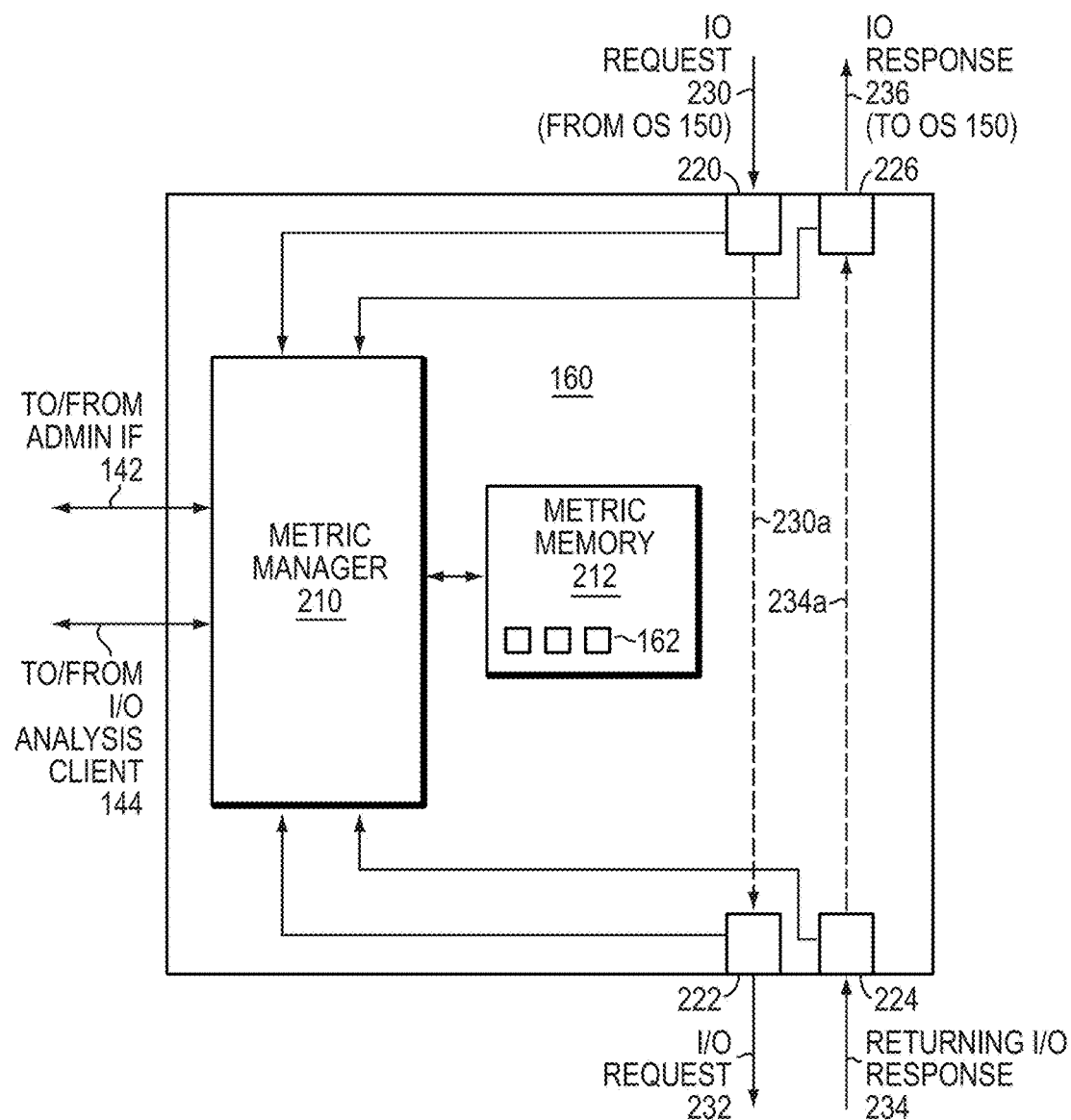
FIG. 2 is a block diagram of an example driver as shown in FIG. 1.

FIG. 2 shows additional details of the driver 160. Here, it is seen that memory 212 includes memory locations 162. The driver 160 also includes I/O monitors 220, 222, 224, and 226, as well as processing pathways 230a and 234a. The I/O monitors 220, 222, 224, and 226 are software constructs within the driver 160 for monitoring I/O requests and I/O responses and for recording timestamps. The processing pathways 230a and 234a respectively indicate pathways through the driver 160 of I/O requests 230 and of I/O responses 234.

During operation, I/O request 230 arrives at the driver 160 from the operating system 150 (or rather, from another portion thereof). The I/O monitor 220 detects the arrival of the I/O request 230 and obtains a timestamp T0 indicating the time and date of arrival of the I/O request 230. The I/O monitor 220 also examines the I/O request 230 to determine how much data the I/O request 230 prescribes to be written or read (i.e., the I/O size). The I/O size and timestamp T0 are sent to metric manager 210, which holds them in memory. The I/O request 230 is then processed by the driver 160 along the pathway 230a. For example, data encryption and a path for transmission to or from storage 180 may be specified, as well as a buffer location for any data returned in response to the I/O request. When the I/O request 230 reaches the end of the processing pathway 230a, the I/O monitor 222 obtains a timestamp T1. The timestamp T1 is sent to the metric manager 210.

Once the I/O request 232 has been sent and safely received, a response is conveyed to the driver 160 in the form of a returning I/O response 234. The returning I/O response 234 includes an acknowledgement indicating whether data was successfully read from or written to the storage 180. The I/O monitor 224 detects the returning I/O response 234 and records a timestamp T2 that indicates the time and date when the returning I/O response 234 reaches the driver 160. The timestamp T2 is sent to the metric manager 210. The returning I/O response 234 then propagates through the driver 160 along the processing pathway 234a. For example, decryption may be specified and applied to any data returned. The returning I/O response 234 encounters the I/O monitor 226 as it passes from the driver 160 and returns to the operating system 150 (or, rather, to another portion thereof) in the form of I/O response 236. The I/O monitor 226 detects the end of processing along the processing pathway 234a and applies a timestamp T3. The timestamp T3 is sent to the metric manager 210. As also shown in FIG. 2, the driver 160 communicates with the administrative interface 142 for receiving management and configuration information. Operations of the driver 160 can be controlled with the administrative interface 142. These operations include, for example, turning on and off monitoring of I/O operations to produce metrics. Also as shown in FIG. 2, the driver 160 communicates with the I/O analysis client 144 for enabling data analysis of data in locations 162.

Figure 3:
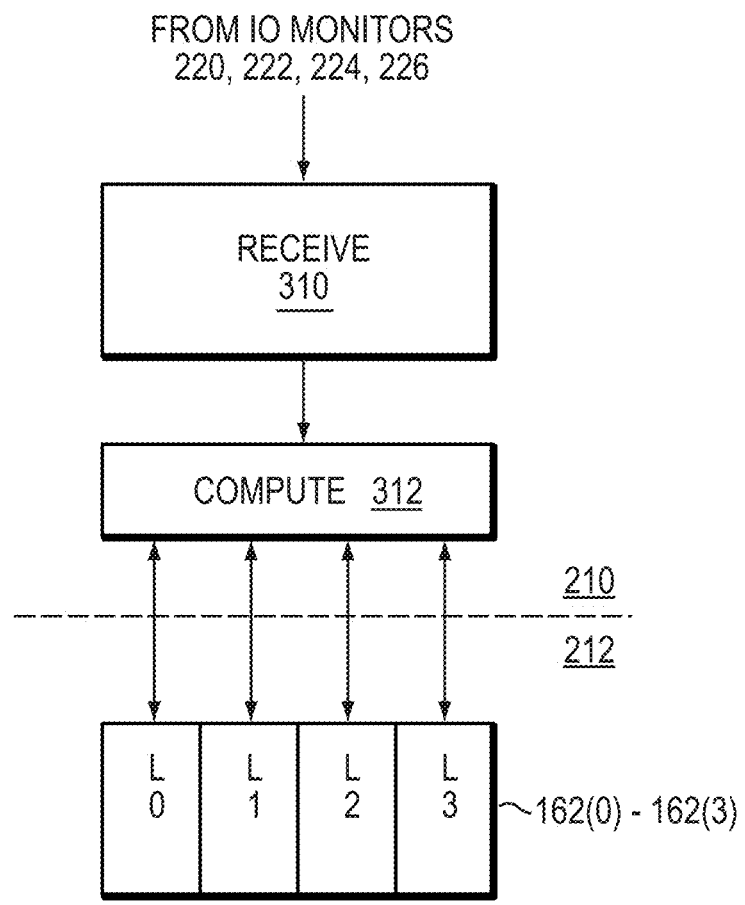
FIG. 3 is a block diagram showing portions of the driver of FIGS. 1 and 2.

FIG. 3 shows additional details of the driver 160. A receive block 310 receives metric values and timestamps from the I/O monitors 220, 222, 224, and 226. Further, a compute block 320 computes metric values based on the timestamps. For example, the compute block 312 can compute driver latency of I/O requests as T1−T0. It can also compute driver latency of I/O responses as T3−T2. Round trip path latency can be computed as T2−T1. Total round trip latency can be computed as T3−T0. In some examples, the receive block 310 and the compute block 320 can obtain and compute a wide range of other metric values pertaining to the driver 160, the paths 122, and/or storage 180.

Additionally, in this particular example, four memory locations 162(0)-162(3) are also provided for storing metric values. Each location 162(0)-162(3) is preferably implemented having, for example, 64 bits. As can be seen, the location 162(0) is represented by 'L0', the location 162(1) is represented by 'L1', the location 162(2) is represented by 'L2', and the location 162(3) is represented by 'L3'. Further, each location comprises a maximum threshold representing the maximum number of metric values that can be associated with each of the locations 162(0)-162(3). For example, the metric value computed by block 312 may be summed into location 162(0). For the purposes of clarity, the metric value may be the first value summed into the location, and as a result the metric value that is summed into the location will be considered as the current metric value associated with that location 162(0). It should be appreciated that the location 162(0) may also have a count associated therewith to indicate that one metric value has been summed into the location. Each future metric computed will subsequently be summed with the current metric value stored at the location 162(0) and the count increased until the threshold is reached. Once the maximum threshold is reached, it is necessary to move to the next location 162(1). This location 162(1) may also have a threshold and a count and the approach with respect to this location is the same as the previous location 162(0). This approach continues until the last location 162(3) is reached at which stage it is required to return in a round robin manner to the first location 162(0). The first location 162(0) is then cleared, and the current metric value and count is set to zero, and the approach repeats itself as described above.

Advantageously, this approach enables an averaged value to be generated by dividing the current metric value at the location (i.e., the summed value of all computed metric values) by the count associated with the same location. For example, this new approach can calculate short term moving average I/O statistics, such as service time, while eliminating the need to store the last n values or statistics for each moving average. Instead, the new improved approach breaks the moving average into a much smaller number (w) of segments (e.g., four locations). Each segment holds the sum of n/w values of the moving average. Each segment takes only one memory location to hold the sum and an associated count. The segments are filled sequentially in order. When the last segment is filled, the first segment is then cleared and reused on a rotating basis.

This improved approach is very memory resource efficient replacing perhaps many tens of thousands of memory locations with four locations in this example. The application of this approach to disk drive service times, for example, requires the code to be located in physical drive object in the kernel. This would not be possible using the older method where thousands of memory locations are required for each drive. The proposed method makes this possible by requiring only 4 memory locations for each drive.

The actual moving average statistic is calculated by adding the values in each segment and dividing by the total number of statistics summed in the segments. This is, typically, required rather infrequently (perhaps once a minute) and may be performed in user space. Each memory location (word) contains the sum of the accumulated values and also the count of the number of arrivals summed in the word. This word may be read by a particular thread as an atomic operation thus eliminating the need for any locking and making the code multicore safe. The length of the moving average and the time period covered is dynamically adjustable. The study of trends in the moving average is available by examining each segment in order since they are filled in a time sequential order.

Figure 4:
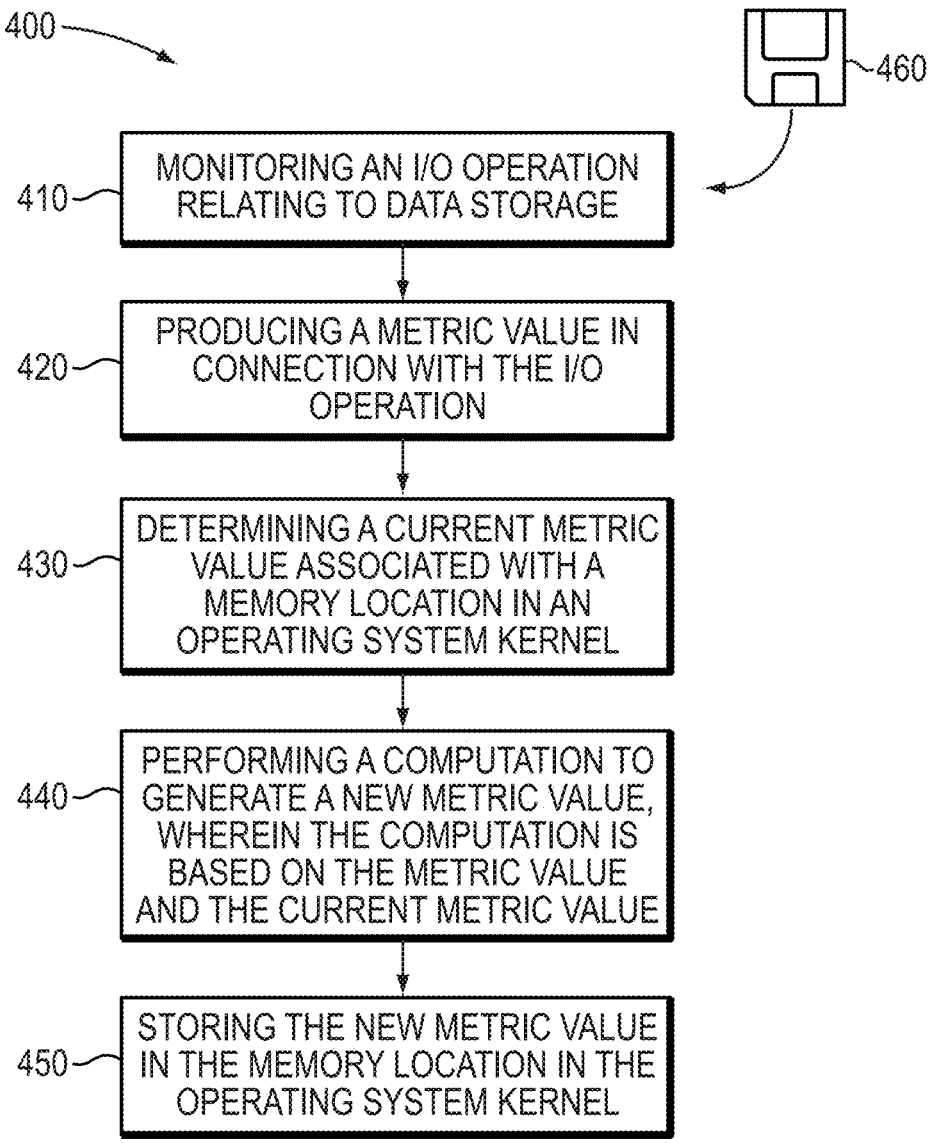
FIG. 4 is a flowchart showing an example method for storing data storage metrics.

FIG. 4 shows an example process 400 that may be carried out in connection with the environment 100 of FIG. 1. The process is typically performed by the software constructs described in connection with FIGS. 1-3, which reside in the memory 130 of SP 120 and are run by processor(s) 124. The various acts of the process 400 may be ordered in any suitable way. Accordingly, embodiments may be constructed in which acts are performed in orders different from those illustrated, which may include performing some acts simultaneously, even though the acts are shown as sequential in the illustrated embodiments.

At step 410, the process monitors an I/O operation relating to data storage. At step 420, the process produces a metric value in connection with the I/O operation. At step 430, the process determines a current metric value associated with a memory location in an operating system kernel. At step 440, the process performs a computation to generate a new metric value. The computation is based on the metric value and the current metric value. At step 450, the process stores the new metric value in the memory location in the operating system kernel.

Furthermore, the process may determine a count signifying an amount of metric values associated with the memory location. It should be noted that this count may be incremented once the new metric value has been stored in the memory location in the operating system kernel. Additionally, it should be understood that the memory location in the operating system kernel is one of a number of memory locations available for storing metric values. The process may, therefore, determine a current metric value associated with a memory location in an operating system kernel by comparing a count associated with one of the number of memory locations to a maximum threshold of metric values that can be associated with the memory location. Subsequently, and upon the comparison indicating that the count is less than the maximum threshold, the process retrieves the current metric value associated with the said one memory location. Alternatively, upon the comparison indicating that the count is equal to or greater than the maximum threshold, the process moves to another one of the number of memory locations to retrieve the current metric value. This step of moving may comprise identifying the next memory location in the particular order by traversing sequentially in a round robin manner through the particular order. The step may also retrieve the current metric value associated with the identified memory location. The current metric value associated with the memory location may be one of a starting value that can be zero, a previous metric value associated with a previous I/O operation or an aggregated metric value that is an aggregation of previous metric values associated with previous I/O operations. Finally, a computation to generate a new metric value may be performed that comprises aggregating the metric value and the current metric value and/or generating an averaged value that includes the metric value and the current metric value.

It should be understood from the foregoing description with respect to the previous figures that the communications (230, 232, 234, 236) are monitored by the metric manager 210. As explained, the metric manager 210 in turn produces various metric values based on times T0, T1, T2 and T3. The metric manager then retrieves or determines a current metric value associated with one of the locations 162 in memory 212. For example, if the count in connection with the location is less than the threshold, the metric value as produced is summed to the current value and the count is increased. The new summed value is stored at the same location 162 in memory 212. The approach continues until the location reaches its threshold. Once this complete, it is necessary to move onto the next location, and the approach with respect to the next location is similar to that as described. When all locations are full, an averaged value may be obtained by adding the current metric value (i.e., the summed value of all metric values) of all locations and dividing the summed total by the total count. The I/O analysis client 144 may also perform various other analyses in connection with the metric values.

The various acts shown in FIG. 4 may be ordered in any suitable way. Accordingly, embodiments may be constructed in which acts are performed in orders different from those illustrated, which may include performing some acts simultaneously, even though the acts are shown as sequential in the illustrated embodiments.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

In addition, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 460 of FIG. 4). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A computer-implemented method, comprising:
receiving an I/O operation at a data storage apparatus;
producing a metric value related to execution of the I/O operation by the data storage apparatus;
comparing a count associated with a memory location in the data storage apparatus to a maximum threshold of metric values associated with the memory location, wherein the memory location is one of a number of memory locations in the data storage apparatus that each have a maximum threshold of metric values associated therewith and the count signifies an amount of metric values associated with the memory location;
in response to the comparison indicating that the count is less than the maximum threshold, determining a current metric value associated with the memory location;
performing a first computation to generate a new metric value related to execution of one or more I/O operations by the data storage apparatus, wherein the first computation is based on the metric value and the current metric value;
storing the new metric value in the memory location in the data storage apparatus;
generating a new count by incrementing the count in connection with the memory location such that the new count is associated with the memory location;
performing a second computation to generate a performance metric value in connection with the data storage apparatus, wherein the second computation is based on the new metric value and the new count; and
reporting the performance metric value in connection with the data storage apparatus.

2. The method as claimed in claim 1, wherein the memory location is one of a number of memory locations available for storing metric values; and
determining a current metric value associated with a memory location, comprises:
upon the comparison indicating that the count is equal to or greater than the maximum threshold, moving to another one of the number of memory locations to retrieve the current metric value.

3. The method as claimed in claim 2, wherein the number of memory locations available for storing metric values are arranged in a particular order; and
moving to another memory location to retrieve the current metric value, comprises:
identifying the next memory location in the particular order, wherein identifying the next memory location involves traversing sequentially in a round robin manner through the particular order; and
retrieving the current metric value associated with the identified memory location.

4. The method as claimed in claim 1, wherein the current metric value associated with the memory location is one of a starting value that can be zero, a previous metric value associated with a previous I/O operation or an aggregated metric value that is an aggregation of previous metric values associated with previous I/O operations.

5. The method as claimed in claim 1, wherein performing a computation to generate a new metric value comprises aggregating the metric value and the current metric value.

6. The method as claimed in claim 1, wherein performing a computation to generate a new metric value comprises generating an averaged value that includes the metric value and the current metric value.

7. An apparatus, comprising:
memory; and
processing circuitry coupled to the memory, the memory storing program code which, when executed by the processing circuitry, cause the processing circuitry to:
receive an I/O operation at a data storage apparatus;
produce a metric value related to execution of the I/O operation by the data storage apparatus;
compare a count associated with a memory location in the data storage apparatus to a maximum threshold of metric values associated with the memory location, wherein the memory location is one of a number of memory locations in the data storage apparatus that each have a maximum threshold of metric values associated therewith and the count signifies an amount of metric values associated with the memory location;
in response to the comparison indicating that the count is less than the maximum threshold, determine a current metric value associated with the memory location;
perform a first computation to generate a new metric value related to execution of one or more I/O operations by the data storage apparatus, wherein the first computation is based on the metric value and the current metric value;
store the new metric value in the memory location in the data storage apparatus;
generate a new count by incrementing the count in connection with the memory location such that the new count is associated with the memory location;
perform a second computation to generate a performance metric value in connection with the data storage apparatus, wherein the second computation is based on the new metric value and the new count; and report the performance metric value in connection with the data storage apparatus.

8. The apparatus as claimed in claim 7, wherein the memory location is one of a number of memory locations available for storing metric values; and wherein the program code which, when executed by the processing circuitry, in order to determine a current metric value, causes the processing circuitry to:

upon the comparison indicating that the count is equal to or greater than the maximum threshold, move to another one of the number of memory locations to retrieve the current metric value.

9. The apparatus as claimed in claim 8, wherein the number of memory locations available for storing metric values are arranged in a particular order; and wherein the program code which, when executed by the processing circuitry, in order to move to another memory location, causes the processing circuitry to:

identify the next memory location in the particular order, wherein identifying the next memory location involves traversing sequentially in a round robin manner through the particular order; and retrieve the current metric value associated with the identified memory location.

10. The apparatus as claimed in claim 7, wherein the program code which, when executed by the processing circuitry, in order to perform a computation, causes the processing circuitry to aggregate the metric value and the current metric value.

11. The apparatus as claimed in claim 7, wherein the program code which, when executed by the processing circuitry, in order to perform a computation, causes the processing circuitry to generate an averaged value that includes the metric value and the current metric value.

12. The apparatus as claimed in claim 7, wherein the current metric value associated with the memory location is one of a starting value that can be zero, a previous metric value associated with a previous I/O operation or an aggregated metric value that is an aggregation of previous metric values associated with previous I/O operations.

13. A computer program product having a non-transitory computer readable medium which stores a set of instructions, the set of instructions, when carried out by processing circuitry, causing the processing circuitry to:

receive an I/O operation at a data storage apparatus;

produce a metric value related to execution of the I/O operation by the data storage apparatus;

compare a count associated with a memory location in the data storage apparatus to a maximum threshold of metric values associated with the memory location, wherein the memory location is one of a number of memory locations in the data storage apparatus that each have a maximum threshold of metric values associated therewith and the count signifies an amount of metric values associated with the memory location;

in response to the comparison indicating that the count is less than the maximum threshold, determine a current metric value associated with the memory location;

perform a first computation to generate a new metric value related to execution of one or more I/O operations by the data storage apparatus, wherein the first computation is based on the metric value and the current metric value;

store the new metric value in the memory location in the data storage apparatus;

generate a new count by incrementing the count in connection with the memory location such that the new count is associated with the memory location;

perform a second computation to generate a performance metric value in connection with the data storage apparatus, wherein the second computation is based on the new metric value and the new count; and report the performance metric value in connection with the data storage apparatus.

14. The computer program product as claimed in claim 13, wherein the memory location is one of a number of memory locations available for storing metric values; and wherein the set of instructions, when carried out by processing circuitry, cause the processing circuitry to determine a current metric value associated with a memory location by:

upon the comparison indicating that the count is equal to or greater than the maximum threshold, moving to another one of the number of memory locations to retrieve the current metric value.

15. The computer program product as claimed in claim 14, wherein the number of memory locations available for storing metric values are arranged in a particular order; and wherein the set of instructions, when carried out by processing circuitry, cause the processing circuitry to move to another memory location to retrieve the current metric value by:

identifying the next memory location in the particular order, wherein identifying the next memory location involves traversing sequentially in a round robin manner through the particular order; and retrieving the current metric value associated with the identified memory location.

16. The computer program product as claimed in claim 13, wherein the set of instructions, when carried out by processing circuitry, cause the processing circuitry to perform a computation to generate a new metric value by aggregating the metric value and the current metric value.

17. The computer program product as claimed in claim 13, wherein the current metric value associated with the memory location is one of a starting value that can be zero, a previous metric value associated with a previous I/O operation or an aggregated metric value that is an aggregation of previous metric values associated with previous I/O operations.

* * * * *